No. 755,239. PATENTED MAR. 22, 1904.
W. E. PENN.
HORSE COLLAR BLOCKING MACHINE.
APPLICATION FILED MAR. 16, 1903.
NO MODEL. 6 SHEETS—SHEET 1.

No. 755,239. PATENTED MAR. 22, 1904.
W. E. PENN.
HORSE COLLAR BLOCKING MACHINE.
APPLICATION FILED MAR. 16, 1903.
NO MODEL. 6 SHEETS—SHEET 2.
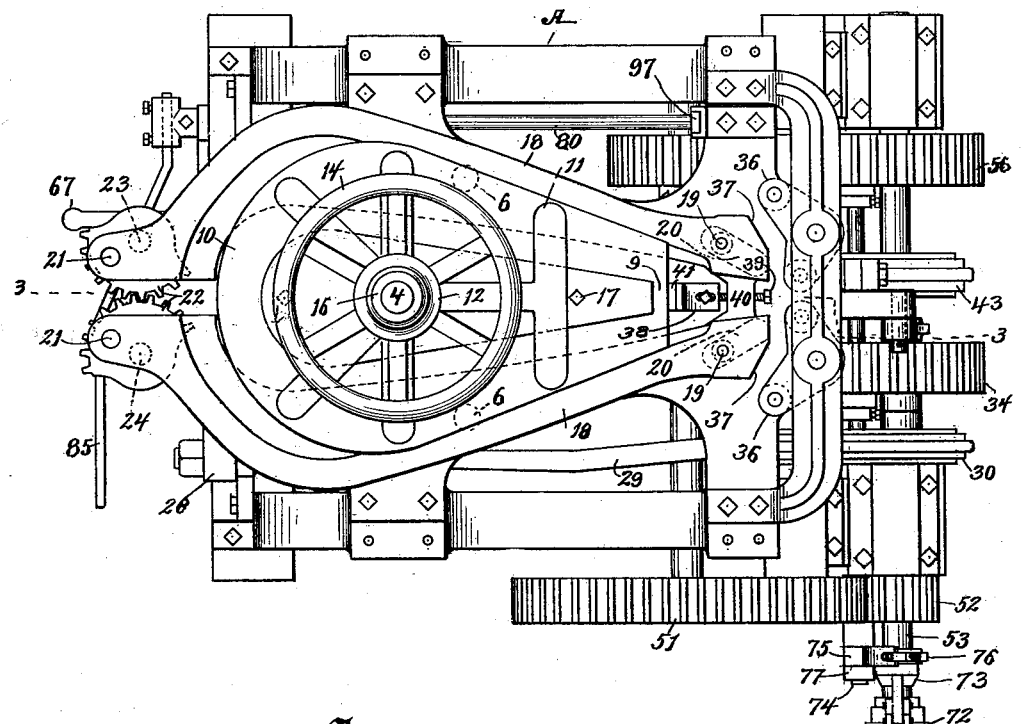
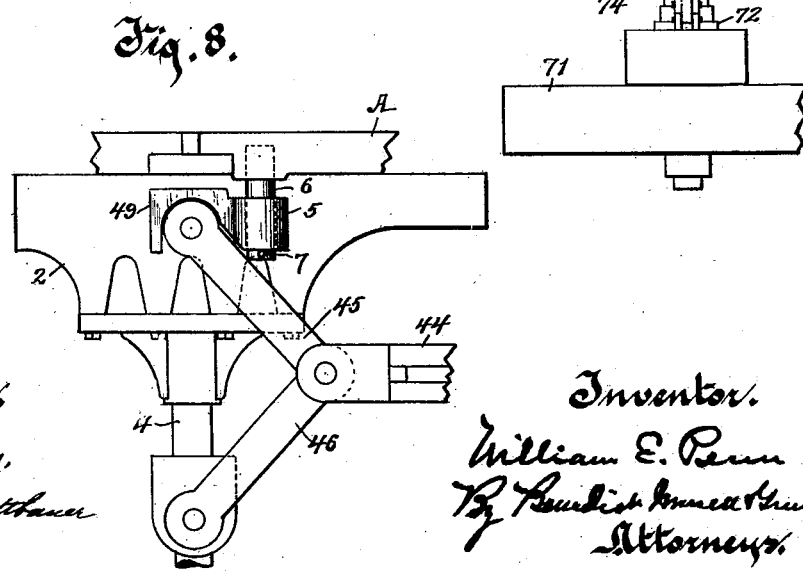
Witnesses.
Inventor.
William E. Penn No. 755,239. PATENTED MAR. 22, 1904.
W. E. PENN.
HORSE COLLAR BLOCKING MACHINE.
APPLICATION FILED MAR. 16, 1903.
NO MODEL. 6 SHEETS—SHEET 3.

Witnesses.
Inventor.
William E. Penn

No. 755,239. PATENTED MAR. 22, 1904.
W. E. PENN.
HORSE COLLAR BLOCKING MACHINE.
APPLICATION FILED MAR. 16, 1903.
NO MODEL. 6 SHEETS—SHEET 4.

No. 755,239. PATENTED MAR. 22, 1904.
W. E. PENN.
HORSE COLLAR BLOCKING MACHINE.
APPLICATION FILED MAR. 16, 1903.
NO MODEL. 6 SHEETS—SHEET 5.

No. 755,239. PATENTED MAR. 22, 1904.
W. E. PENN.
HORSE COLLAR BLOCKING MACHINE.
APPLICATION FILED MAR. 16, 1903.

NO MODEL. 6 SHEETS—SHEET 6.

Witnesses.
Inventor.
William E. Penn

No. 755,239. Patented March 22, 1904.

UNITED STATES PATENT OFFICE.

WILLIAM E. PENN, OF LAKEMILLS, WISCONSIN, ASSIGNOR TO FRANK B. FARGO AND ENOCH J. FARGO, OF LAKEMILLS, WISCONSIN.

HORSE-COLLAR-BLOCKING MACHINE.

SPECIFICATION forming part of Letters Patent No. 755,239, dated March 22, 1904.

Application filed March 16, 1903. Serial No. 147,906. (No model.)

*To all whom it may concern:*

Be it known that I, WILLIAM E. PENN, residing at Lakemills, in the county of Jefferson and State of Wisconsin, have invented a new and useful Improvement in Horse-Collar-Blocking Machines, of which the following is a description, reference being had to the accompanying drawings, which are a part of this specification.

My invention relates to improvements in horse-collar-blocking machines in which steam or other powerful medium is employed for shaping or forming the collars about a forming-block member or shaper in connection with clamping and pressing devices under great pressure.

The machine is adapted to be employed in series—that is, it is desirable in a factory to set up a number of these machines in a row, side by side connectedly—thus enabling a single attendant to operate or use many machines, the attendant putting a collar into one machine and putting it under shaping pressure and leaving it until it has permanently assumed its shape, while he in the meantime gives his attention to putting collars into the other machines of the series.

The invention consists of the novel mechanism, its parts, and combinations, as herein described and claimed, or the equivalents thereof.

Figure 1:
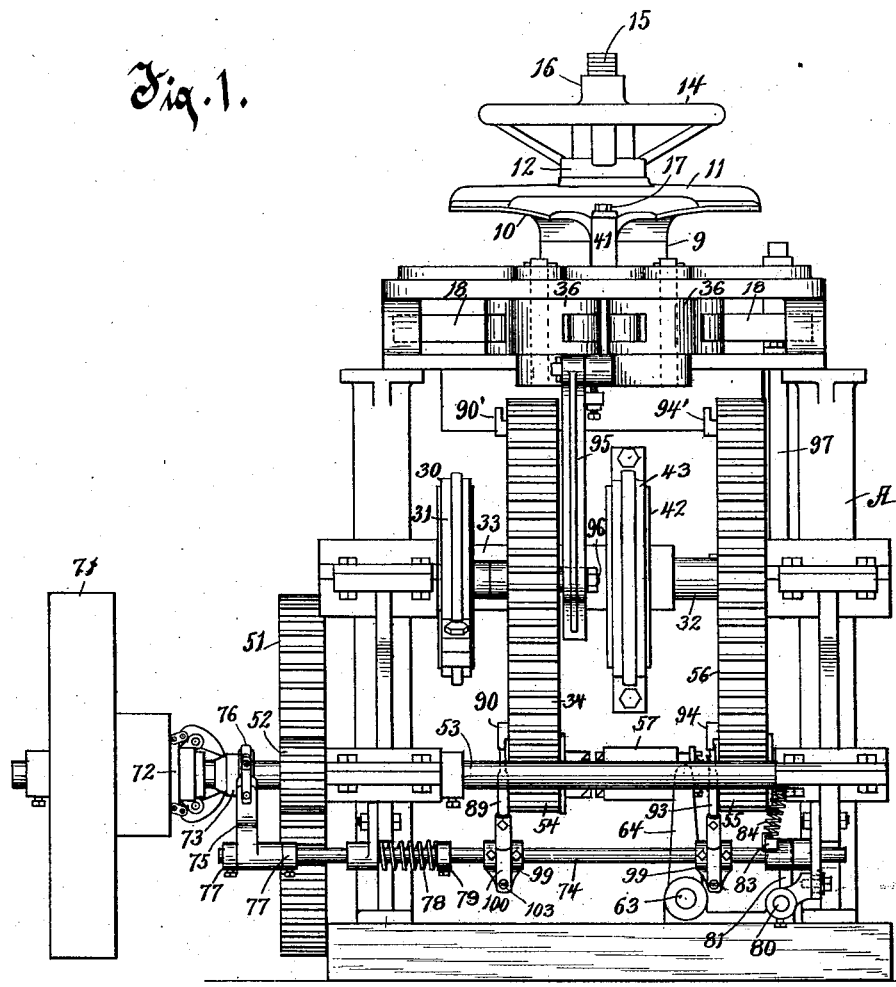
Figure 3:
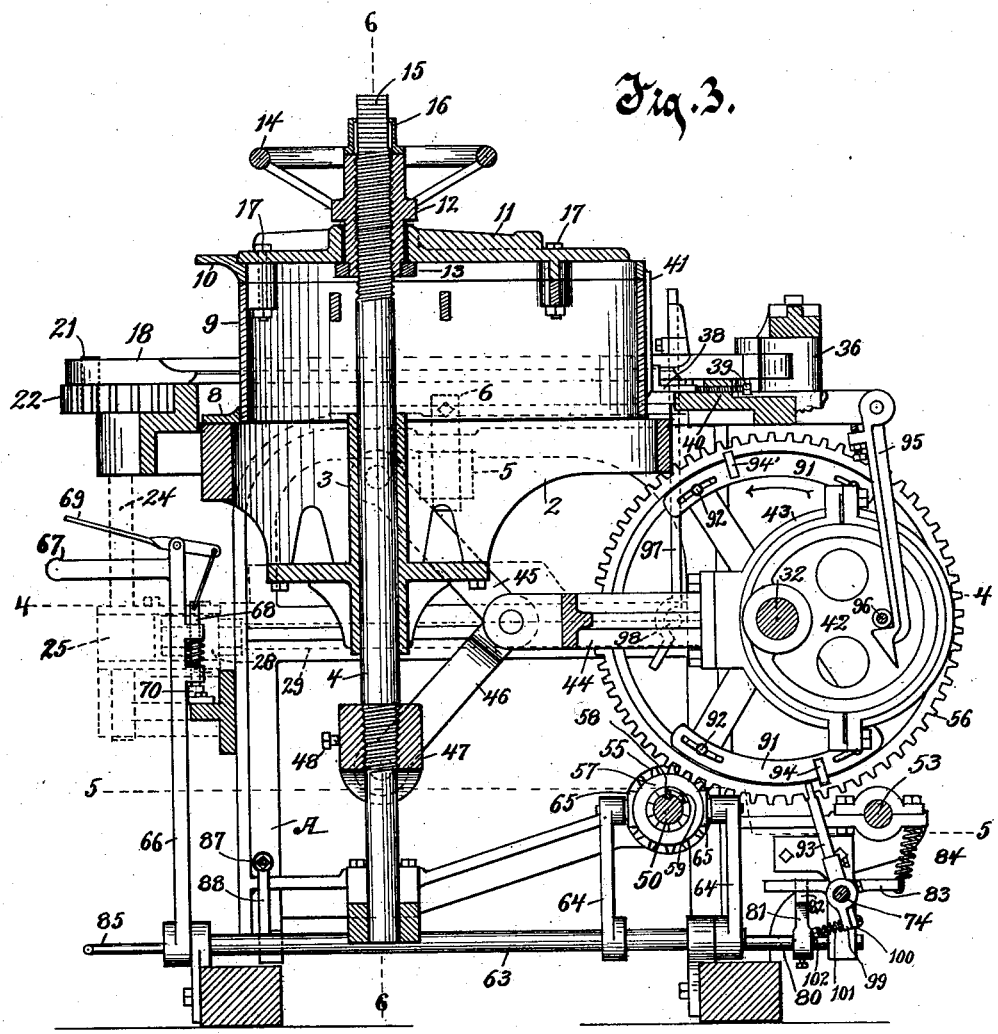
Figure 4:
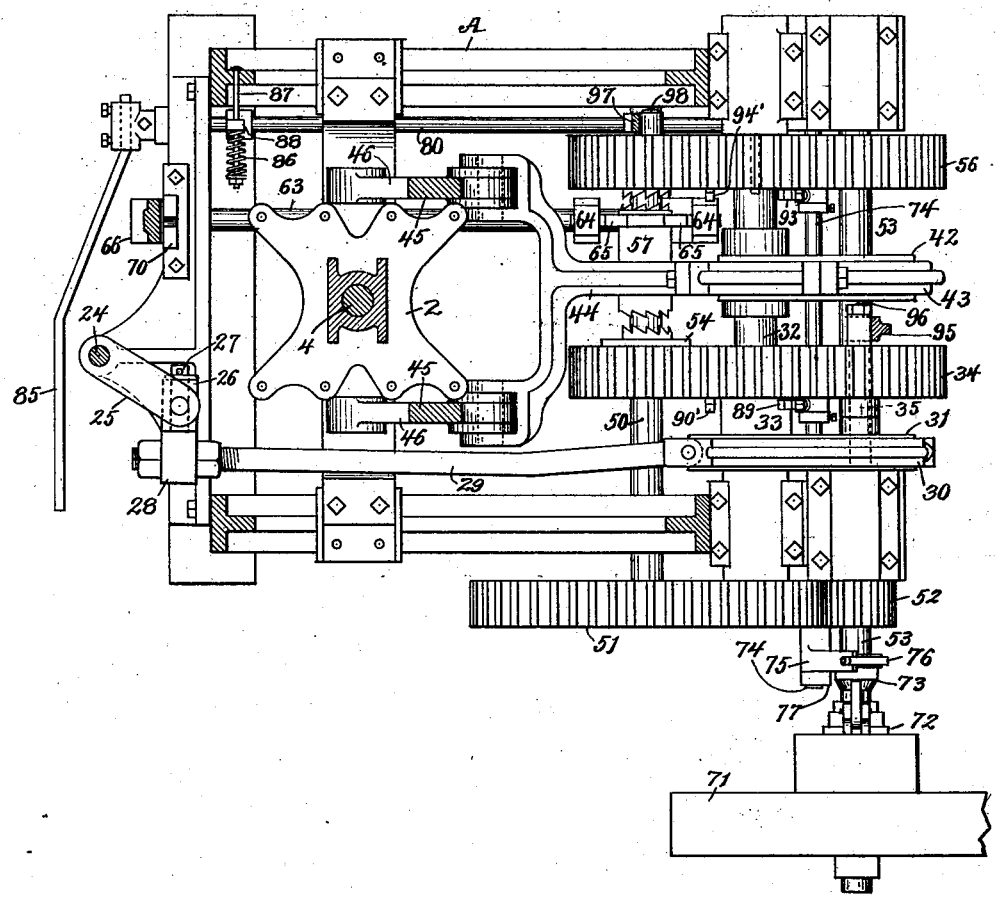
Figure 5:
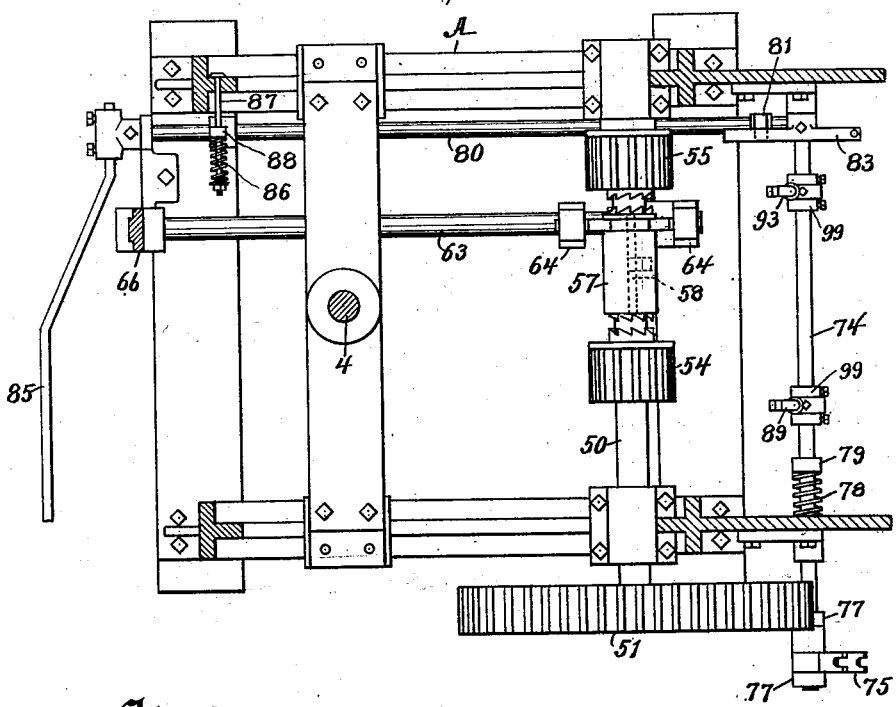
Figure 9:
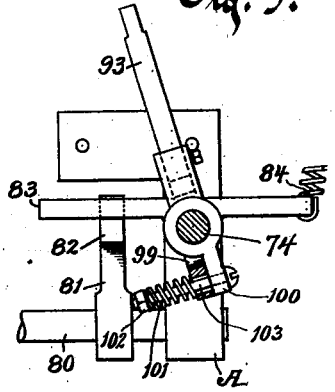
Figure 10:
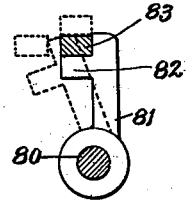
Figure 12:
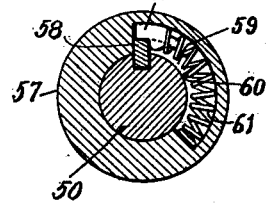
Figure 11:
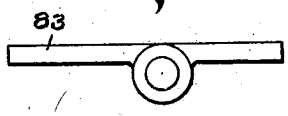
Figure 6:
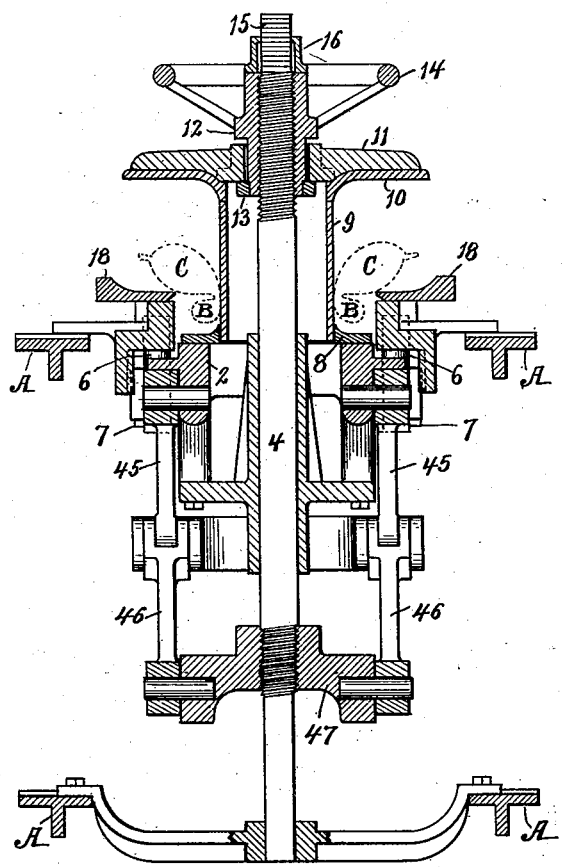
Figure 7:
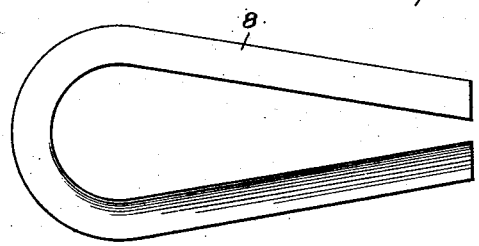

In the drawings, Figure 1 is an elevation of the rear of the machine at the right in the plan of Fig. 2. Fig. 2 is a top plan of the machine. Fig. 3 is a vertical section of the machine from front to rear on line 3 3 of Fig. 2, the section showing the portion of the machine toward the top in the plan of Fig. 2, though parts belonging to the other portion of the machine are indicated in dotted lines to exhibit the relations of such parts to the parts in full lines in Fig. 3. Fig. 4 is a horizontal section on line 4 4 of Fig. 3. Fig. 5 is a horizontal section on line 5 5 of Fig. 3. Fig. 6 is a vertical section on line 6 6 of Fig. 3, with which also there is shown in dotted lines the two sides of a horse-collar in cross-section, the collar being in position about the block member for being formed or shaped by the machine. Fig. 7 is a plan of the lower or roll-forming member. Fig. 8 shows a detail of mechanism for moving the wale-forming member and the roll-forming member toward and from each other. Fig. 9 illustrates a detail of a tripping device for putting parts of the machine into and out of operation and related purposes. Figs. 10 and 11 show details of the tripping device of Fig. 9. Fig. 12 is a section of a detail of a yielding clutch.

In the drawings, A represents a frame of such suitable size and form as is best adapted for the support of the operative parts of the machine. A bed-piece 2 of hollow oval construction in cross-section horizontally is provided with a medial elongated hub-like bearing 3, through which a substantial guide-rod 4 passes movable vertically. This guide-rod at it slower end has a bearing in the frame, in which also it is movable vertically. The bed-piece 2 is provided with ears 5 5, and guide-pins 6 6, fixed in and projecting downwardly from the frame, pass through the seears, the ears being movable vertically on the guide-pins. Advisably pins 7 7 are inserted transversely through the guide-pins 6 below the ears 5 to limit the movement of the bed-piece downwardly.

A roll-forming member 8 rests loosely on the top edge of the bed-piece 2. This roll-forming member 8 is of the general form longitudinally of the length of the collar to be shaped, and in cross-section the top surface of this roll-forming member is curved to adapt it to properly shape or form the outer side of the roll B of a collar. The roll-forming member 8 is preferably open at that end which corresponds with the withers of the collar to be formed thereon.

A hollow forming-block member 9, which in cross-section is oval in shape, being adapted to receive about it and form the horse-collar thereon, is continuous at its upper end with the outwardly-curved and horizontally-projecting wale-forming member 10, which wale-forming member is coextensive in a horizontal direction with the forming-block member 9, and both of these members are secured to and depend from the spider 11, which is mounted on the hub 12, that turns by a screw-thread on the guide-rod 4. The hub 12 is provided with an annular groove into which the spider 11 fits movably with a slight amount of lateral and vertical play. The lower wall of the groove in the spider is formed conveniently by a collar 13, fixed on the hub. The hub 12 is provided with a hand-wheel 14. By this construction the forming-block member and the roll-forming member are adjustable vertically on the guide-rod 4, and an index 15 on the guide-rod with an index-finger 16, conveniently in circumferential form, serve to indicate the extent of the adjustment of the forming-block member up or down on the guide-rod. The forming-block member and the wale-forming member are secured to the spider conveniently by bolts 17 17 through the spider and through projecting parts of the forming-block member and the wale-forming member. The wale-forming member 10 is so curved and projected outwardly as to adapt it to form a surface of the wale C of the collar.

For forming the hame-crease in the collar and parts adjacent thereto I provide a pair of crease-forming members. These crease-forming members consist of a pair of clamping-levers 18 18, conforming in length in a general way to the exterior elongated oval form of the horse-collar. These levers 18 are pivoted movably on the frame at their rear ends, corresponding with the withers end of the collar, by means of pins 19 19, fixed in the levers and provided with antifriction-rollers that enter and travel in slots 20 20 therefor in the frame. These slots converge toward each other rearwardly and by this convergence are adapted to draw these ends of the levers 18 toward each other when the levers are pushed rearwardly, although other means, hereinafter described, are provided for a more powerful bringing of these levers together at their rear ends. These levers 18 rest movably on the frame, and along their inner edges and on the upper surface adjacent thereto are formed to shape the hame-crease in the collar and adjacent parts, and especially the adjoining surfaces of the wales of the collar, when the levers are brought into contact therewith under suitable clamping pressure and movement thereof. At their front ends adjacent to the obtuse or rounded end of the collar these clamping-levers 18 are each pivoted by a pin 21 to a segmental cog-wheel 22, which pins 21 are fixed in the cog-wheels eccentrically. These cog-wheels are so disposed as to mesh with each other and are mounted one by a concentric stud-pin 23 revolubly on the frame and the other is mounted revolubly on the frame by a concentric shaft 24, which shaft near its lower end is provided with a crank-arm 25, which at its outer end is furcate and is pivoted on a block 26, revoluble on a pin 27, fixed in a pin-head 28, secured rigidly on an eccentric-rod 29 conveniently by means of nuts, one at each side of the head, turning on the eccentric-rod and clamping the pin-head. At its distant end the rod 29 is pivoted to the strap 30 on the eccentric 31, which eccentric is loose on the shaft 32, which shaft has its bearings in boxes on the frame therefor. A hub 33 on the eccentric 31 is interposed between that eccentric and the cog-wheel 34, which is also loose on the shaft 32. The eccentric 31 and cog-wheel 34 are held to coincident rotation by means of a dowel-pin 35, inserted in and connecting two eccentric-bosses, respectively, on the wheel 34 and the eccentric 31. This is a convenient form of construction for securing the eccentric 31 rigidly to the wheel 34 and mounting them loose on the shaft.

It will be understood that by the mechanism just described means are provided for bringing the front ends of the levers 18 toward each other from the position shown in Fig. 2 and carrying the levers rearwardly, thus bringing them against an interposed collar on and about the forming-block member 9. At the rear ends of the members 18 two bell-crank levers 36 36 are mounted on the frame and are so disposed that when the clamping-levers 18 are forced rearwardly these levers engage the inner arms of these bell-cranks and force them rearwardly, whereby the outer arms of the bell-cranks are forced against the outer lateral ends of the levers 18 18 and carry the clamping-levers inwardly toward each other. The arms of the bell-cranks 36 are in such oblique positions as to accomplish this result, the ends of the levers 18 being advisably beveled at 37 37 to properly contact with the arms of the bell-cranks to thus force them inwardly toward each other when the clamping-levers are pushed rearwardly. The movements inwardly produced by these bell-cranks on the levers 18 18 is concurrent with the movement of the levers rearwardly, so that the direction of the movements of the levers 18 18 corresponds with the inclinations of the slots 20 in the frame. A stop 38, adjustable on the frame forward and back by means of a screw 39, turning through a boss 40 on the frame, is adapted to receive against it movably a rib 41, fixed on the forming-block member at its rear end, whereby the forming-block member is sufficiently held against any undue rearward movement thereof.

It will be observed that the clamping-levers 18 are mounted on the frame in a horizontal plane that is unvarying and that the roll-forming member 8 and the wale-forming member 10, with the forming-block member 9, are adapted to be moved up and down, respectively, toward and away from the intermediate horizontal plane of the crease-forming clamping-lever members 18, and for thus moving the members 8 and 10, respectively, up and down I provide mechanism as follows: An eccentric 42, fixed on the shaft 32, is provided with a strap 43, to which a furcate eccentric-rod 44 is attached, and toggle-joint arms 45 46 are pivoted to the furcate extremities of this eccentric-rod, and at their distant ends the arms 45 are pivoted to the bed-piece 2, and the arms 46, extending in the reverse direction, are pivoted to a block 47, secured adjustably to the guide-rod 4 by means of a screw-thread and a set-screw 48. It will be understood that by this construction the roll-forming member 8 can be raised from the position shown in Figs. 3 and 6, and the block-forming member 9 and wale-forming member 10 can be brought down from the positions shown in Figs. 3 and 6 concurrently and to a proper extent to bring these members into contact with the interposed collar by the rotation of the eccentric 42. Shoulders 49, rigid on the bed-piece 2, are advisably provided, which shoulders curve about the thereto-pivoted ends of the toggle-joint arms 45 and are adapted to receive against them the thrust of the arms 45, either as constructed or when the pivot-pins that connect the toggle-joint arms 45 to the bed-piece shall have become worn to any appreciable extent.

A counter-shaft 50, having its bearings in the frame, is provided with a cog-wheel 51, that gears with a pinion 52, fixed on a driving-shaft 53, mounted on the frame. The counter-shaft 50 is also provided with pinions 54 and 55, revolubly loose on the shaft and meshing, respectively, with the cog-wheel 34 and with a cog-wheel 56, fixed on shaft 32. A clutch 57, splined and slidable endwise on the counter-shaft 50, is provided with ratchet-teeth at its ends adapted to engage, respectively, with complementary ratchet-teeth on the pinions 54 and 55. This clutch 57 is mounted on the shaft 50 yieldingly, rovolubly, limitedly. For this purpose the key or spline 58, fixed in the shaft 50, projects into a segmentally-elongated slot 59 in the clutch, whereby the clutch may rotate from the position shown in Fig. 12 with reference to the spline to a position in which the spline engages the other wall of the slot at 60. To hold the clutch yieldingly in the position shown in Fig. 12, a coiled-wire spring 61 is placed in a segmental recess therefor in the clutch and bears at one end against the clutch and at the other end carries a block 62, which engages the spline 58 and is movable therewith when the spring is compressed back to the point at which the spline engages the wall or shoulder 60. The spring 61 is a stiff one; but its capability to yield under heavy pressure prevents a sudden rigid engagement of the teeth on the clutch 57 with the teeth on the pinions 54 or 55, and thereby prevents shock.

To enable the attendant to shift the clutch 57 into or out of engagement with the pinion 54 or 55, a rock-shaft 63 is provided, which is mounted on the frame and is provided with radial arms 64 64, and blocks 65 65, swiveled in the arms 64, are provided with curved faces that ride in an annular groove therefor in one end of the clutch 57. A lever-handle 66, projecting upwardly from the rock-shaft 63, is provided with a handle 67 and with a spring-actuated latch 68, having a thumb-lever 69, which latch is adapted to engage the catch 70, fixed on the frame at its respective ends, and by entering a notch therefor centrally. When the latch 68 engages the catch 70 centrally, it holds the clutch 57 in the medial position and out of action, as shown in Figs. 4 and 5, and by shifting the lever-handle 66 to the right or left the clutch 57 can be put into engagement with the pinion 54 or 55, as desired.

The driving-shaft 53 is provided with a band-pulley 71, loose on the shaft, and a clutch 72, splined on the shaft, is adapted to be put into engagement with the hub of the band-pulley through a collar 73, also splined on the shaft by means of a rock-shaft 74, mounted on the frame and provided with a radial furcate arm 75, revolubly loose on the rock-shaft, which is pivoted to a ring 76, riding in an annular groove therefor in the collar 73. The rock-shaft 74 has endwise movement in its bearings on the frame, and the arm 75 is held to movement endwise with the rock-shaft by the abutting collars 77, secured adjustably on the rock-shaft. The slidable rock-shaft 74 is provided with a coiled-wire expansion-spring 78, interposed between the frame and a collar 79 on the shaft, by means of which the collar 73 is withdrawn from the clutch 72, so that the clutch is out of engagement with the band-pulley 71 normally. Another rock-shaft, 80, mounted in the frame, is provided with a radial arm 81, having a laterally-projecting finger 82 near its outer end, which radial arm 81 and finger 82 are adapted to engage in different positions with a bar 83, mounted transversely on the rock-shaft 74. A spring 84, anchored on the frame and connected to the bar 83, is adapted to hold the rock-shaft 74 in initial position revolubly. The bar 83, that rests initially on the finger 82 in the manner shown in Figs. 9 and 10 may also when the finger 81 is thrown forward into the position shown in dotted lines in Fig. 10 under certain conditions of the work bear against the front side of the arm 81 or against the outer end of the radial arm 81, as indicated in dotted lines in Fig. 10. The rock-shaft 80 is provided with a foot-pedal 85, by which the attendant can rock the shaft. A spring 86, bearing at its outer end against a nut on a bolt 87, fixed in the frame, bears at its inner end against a radial arm 88 on the rock-shaft 80 and is adapted to hold the rock-shaft yieldingly up to initial position.

When by the operation of the machine a collar therein has been clamped by the levers 18 and also thereafter when the collar has been put under pressure by the roll-forming member 8 and the wale-forming member 10, the operative mechanism must be left in these pressing and compressing positions, and to stop the movements of the operating mechanism at the proper moments I provide means whereby this is accomplished automatically. In connection with the mechanism for clamping the levers 18 about the collar in the hame-creases a tripping-arm 89 is mounted radially and adjustably on the sliding rock-shaft 74 and two cam-teeth 90 90' are fixed on the side of the wheel 34, the cam-teeth being substantially diametrically opposite each other on the wheel. The arm 89 is advisably made in two sections, one telescoping in the other, whereby the arm is made adjustable in length, as well as adjustable rotatively and slidably on the rock-shaft 74. The cam-teeth 90 90' on wheel 34 and 94 94' on wheel 56 are advisably mounted adjustable revolubly on their wheels, and this is accomplished conveniently by fixing each tooth on a segmental plate 91, fitted to the wheel and secured thereto adjustably about the axis of the wheel by bolts fixed in the wheel and projecting through elongated segmental slots therefor in the plates, the bolts being provided with nuts that turn down against the plates. The specific construction is clearly shown in Fig 3 in connection with wheel 56. The cam-teeth 90 90' are so located on the wheel that when they come to the tripping-arm 89 they engage it and throw it over to such extent as to lift the bar 83 momentarily out of engagement with the arm 81 on the rock-shaft 80, whereby the rock-shaft 74 is made free to be moved by the spring 78, thereby releasing the clutch 72 from the running belt-pulley 71 and stopping the machine. Similar devices are employed in connection with the wheel 56, there being an adjustable tripping-arm 93 on the rock-shaft 74 so constructed and disposed as to be adapted to engage the cam-teeth 94 94', mounted adjustably on the wheel 56 substantially in the same manner as the cam-teeth 90 90' are mounted on the wheel 34. A hanger-hook 95, pivoted and depending from the frame, is adapted to automatically engage a stud-pin 96, fixed eccentrically in the wheel 34 and support the wheel and related parts in its initial position against any backlash or rearward movement when the mechanism is at rest in released position. The end of the hanger-hook is made beveled, so that the stud-pin 96 contacts with the beveled end of the hook and swings it outwardly as the pin comes thereto in the forward movement of the wheel. A similar hook-hanger 97, also hinged on the frame, depends therefrom and is adapted to engage a stud-pin 98, fixed eccentrically in the wheel 56, whereby that wheel is also caught and held against backlash or against rearward movement when the machinery is released and at rest.

In use a collar that is to be pressed, and thereby shaped or formed, is placed in the machine about the framing-block member 9, the collar for this purpose being open at the withers end, and thereupon the attendant places his foot on the foot-pedal 85, pressing it down, and thereby through the bar 83 shifts the rock-shaft 74 endwise, putting the clutch 72 into engagement with the running band-pulley 71. The running band-pulley communicates motion to the driving-shaft 53, and thence to the counter-shaft 50. Thereupon the attendant shifts the lever-handle 66, throwing the clutch 57 into engagement with the pinion 54, thereby starting the wheel 34 and the eccentric 31, whereby the clamping-levers 18 are moved inwardly to and about the horse-collar, the clamping-levers or crease-forming members entering the hame-crease in the collar and drawing the collar in that plane tightly to and about the framing-block member 9. In doing this the wheel 34 revolves a half-revolution, thereby moving the clamping-levers up to their seat on the collar, and at the end of this half-revolution the cam-teeth 90 90' engage the tripping-lever 89 on the rock-shaft 74 and trip that shaft to such extent that it is released from the radial arm 81 on the rock-shaft 80, and the rock-shaft 74 will then under the action of the spring 78 slide endwise, withdrawing the clutch 72 from the belt-pulley 71, stopping the mechanism. The eccentric 31 and the mechanism connected therewith being at a dead-center remain in this position in which the collar is clamped tightly by the arms 18. Thereupon the attendant having already removed his foot from the pedal 85 again puts his foot on that pedal, forcing it down and starting the counter-shaft 50, and thereupon he shifts the lever-handle 66 in the other direction and puts the clutch 57 into engagement with the pinion 55, and thereby starts the wheel 56 and rotates the eccentric 42 a half-revolution, whereby the roll-forming member 8 is elevated and the wale-forming member 10 is brought down, respectively, against the collar below and above, pressing it and shaping it on and about the forming-block member and against the interposed and encircling crease-forming member consisting of the clamping-levers 18. When this pressure has been thus applied by the half-revolution of the eccentric 42, the mechanism will be stopped automatically by the cam-teeth 94 94' engaging the tripping-arm 93 on the rock-shaft 74 and tripping it, whereby the rock-shaft 74 is released from the radial arm 81 on the rock-shaft 80 and is permitted to slide endwise under the action of spring 78, releasing the clutch 72 from the running pulley 71. The eccentric-rod 44 being in the dead-center of the eccentric 42, the roll-forming member and the wale-forming member are held in place, pressing against the collar. In this condition the attendant can leave the machine until the collar under pressure has assumed permanent form. In the meantime the attendant can look after other machines located alongside in the factory.

As no two collars when they come from the workmen who have sewed up the leather covering and have stuffed them are of exactly the same form or size, and as frequently one side of the collar is stuffed a little more firmly or extensively than the other side is, it is desirable to have the blocking-machine adapted for shaping collars under these conditions. It is with reference to this that the roll-forming member 8 is placed loosely on the bed-piece 2 and that the forming-block member 9 and wale-forming member 10 are supported on the hub 12 loosely—that is, with lateral play. This play of these collar-forming members permits of their movement laterally slightly, so as to adapt themselves to the collar somewhat and also to each other, and even permits a slight tilting of the members 9 and 10 if such tilting shall be required in the shaping of the collar. When the collar under pressure has assumed permanent shape, the attendant releases and removes the collar from the machine by reversing the operations through the medium of the lever-handle 66 and the pedal 85, by which the collar was placed under pressure in the machine.

As it is possible that a certain amount of backward movement or backlash may occur to the wheels 34 and 56, including the eccentrics rigid thereto, respectively, I make provision for the possible contact of the cam-teeth 90 94 with the tripping-arms 89 and 93 when thus moving backwardly in and by so mounting the tripping-arms 89 and 93 on the slidable rock-shaft 74 that the cam-teeth can pass them when thus moving in a rearward direction. For this purpose the tripping-arms 89 and 93 are mounted revolubly on the shaft 74 between the furcate members of clip-stops 99, which are secured to the shaft 74 adjustably by means of set-screws. The arms 89 and 93 are provided with rearwardly-projecting fingers 100 100, that engage in one direction the stops 99 and are held yieldingly thereto in the other direction by springs 101, interposed between the stops and nuts 102 on bolts 103, fixed in the arm-fingers 100, whereby the tripping-arms are permitted to tilt sufficiently to permit the cam-teeth 90 94 to pass them when they move rearwardly without affecting the rock-shaft 74.

What I claim as my invention is—

1. In a horse-collar-blocking machine, a roll-forming member movable vertically, a forming-block member with a wale-forming member rigid thereto and movable toward and from the roll-forming member and means adapted to move the roll-forming member and the forming-block and wale-forming members toward and from each other synchronously.

2. In a horse-collar-blocking machine, a vertically-movable bed-piece, a roll-forming member supported and free to move laterally on the bed-piece, and a forming-block member encircled by and movable through the roll-forming member.

3. In a horse-collar-blocking machine, a vertically-movable bed-piece, a roll-forming member supported and movable laterally on the bed-piece, a forming-block member with a wale-forming member rigid thereon, and centrally-disposed means for supporting and raising and lowering the forming-block member and the wale-forming member and on which support said members have lateral play.

4. In a horse-collar-blocking machine, a vertically-movable guide-rod, a hub adjustable endwise thereon, and a combined wale-forming and forming-block member swiveling on the hub and having lateral play thereon.

5. In a horse-collar-blocking machine, a frame, crease-forming lever members mounted on the frame to have endwise and lateral movement, means adapted to force them endwise, and bell-cranks mounted on the frame at the rear ends of the crease-forming members and disposed to be engaged and actuated by the crease-forming members as they are forced rearwardly and by such movement to otherwise engage the crease-forming members and force them toward each other.

6. In a horse-collar-blocking machine, a frame, crease-forming lever members mounted on the frame to have endwise and lateral movement and provided with beveled rear ends, means adapted to force the crease-forming members endwise, and bell-cranks mounted on the frame adapted to be engaged and actuated by the crease-forming members when moved rearwardly and to thereupon engage the beveled ends of said crease-forming members and force them toward each other.

7. In a horse-collar-blocking machine, a frame, a framing-block member mounted on the frame to have vertical movement and a limited amount of lateral play, a vertically-disposed rib on the forming-block member at its rear, and an adjustable stop on the frame adapted to receive the bearing of the rib against it and prevent a displacement of the forming-block member rearwardly.

8. In a horse-collar-blocking machine, a frame, clamping-levers, segmental intermeshing gears pivoted on the frame and connected eccentrically to movable extremities of the clamping-levers, a rock-shaft fixed to and forming the pivot of one of said gears, an eccentric, and a rod connecting the eccentric to a crank-arm on the rock-shaft.

9. In a horse-collar-blocking machine, a frame, clamping-levers, segmental intermeshing gears pivoted on the frame and connected eccentrically to movable extremities of the clamping-levers, a rock-shaft fixed to and forming the pivot of one of said gears, an eccentric, a rod connecting the eccentric to a crank-arm on the rock-shaft, and means for holding the eccentric against rearward movement.

10. In a horse-collar-blocking machine, movable clamping-arms, a rock-shaft connected mechanically to and for moving the clamping-arms, an eccentric connected mechanically to and for oscillating the rock-shaft, a wheel concentric with the eccentric and revoluble therewith, cam-teeth on the wheel, and means adapted to be engaged by the cam-teeth for releasing the driving mechanism and stopping the machine.

11. In a horse-collar-blocking machine, a gear-actuating rock-shaft provided with a crank-arm, an eccentric on a driven shaft, an eccentric-strap, an eccentric-rod pivoted to the eccentric-strap, a head on the rod provided with a laterally-projecting pin, and a block revoluble on the pin and to which the end of said crank-arm is pivoted.

12. In a horse-collar-blocking machine, a frame, guiding-pins fixed in and projecting downwardly from the frame, a bed-piece movable vertically on said pins, a roll-forming member resting on the bed-piece, a guide-rod movable vertically in the frame and about which the bed-piece has a bearing, a forming-block member and a wale-forming member rigidly connected together and mounted on the guide-rod, and means for moving the guide-rod down and the bed-piece up concurrently.

13. In a horse-collar-blocking machine, concurrently-movable wale-forming and roll-forming members, a revoluble shaft, an eccentric fixed on the shaft, means connecting the eccentric mechanically and operatively to the roll-forming member and to the wale-forming member, a cog-wheel on the shaft, cam-teeth on the cog-wheel, and means to be engaged by the cam-teeth on the cog-wheel adapted to trip an arm and put the eccentric out of action.

14. In a horse-collar-blocking machine, a frame, a shaft, a wheel thereon for rotating the shaft, releasable means for rotating the wheel and shaft, an eccentric on the shaft, means actuated by the eccentric for raising and lowering the collar-forming members, and a hanger-hook adapted to engage an eccentric-pin on the wheel and prevent backward movement of the eccentrics and connected parts.

15. In a horse-collar-blocking machine, a frame, a shaft, a wheel and an eccentric held to synchronous rotation on the shaft, releasable means for rotating the wheel and the eccentric, means actuated by the eccentric for moving clamping-arms, and means adapted to engage the wheel and prevent backward movement of the wheel and the eccentric when the wheel is released from its driving mechanism.

In testimony whereof I affix my signature in presence of two witnesses.

WILLIAM E. PENN.

Witnesses:
 ELSIE FARGO,
 LUTE ANDERSON.